United States Patent [19]
Ito et al.

[11] Patent Number: 5,502,798
[45] Date of Patent: Mar. 26, 1996

[54] IMAGE PROCESSING APPARATUS FOR SYNTHESIZING Z-AXIS COORDINATE DATA USING X- AND Y-DIRECTION INCREMENTS

[75] Inventors: Kazumasa Ito, Tokyo; Hiroshi Kato, Kanagawa; Junichi Fujita, Tokyo, all of Japan

[73] Assignee: Sony Corporation, Tokyo, Japan

[21] Appl. No.: 311,907

[22] Filed: Sep. 26, 1994

Related U.S. Application Data

[63] Continuation of Ser. No. 951,110, Sep. 25, 1992, abandoned.

[30] Foreign Application Priority Data

Sep. 27, 1991 [JP] Japan .................................. 3-276529

[51] Int. Cl.$^6$ ........................................................ G06F 15/62
[52] U.S. Cl. ............................................ 395/119; 395/122
[58] Field of Search ..................... 395/119–122, 127–129

[56] References Cited

U.S. PATENT DOCUMENTS 4,697,178  9/1987  Heckel .................................. 395/122
4,992,780  2/1992  Penna et al. ......................... 340/729
5,144,291  9/1992  Nishizawa ............................ 395/121

FOREIGN PATENT DOCUMENTS

WO88/04804  6/1988  WIPO .
8804804  6/1988  WIPO .............................. G06F 3/14

Primary Examiner—Mark R. Powell
Assistant Examiner—Ba Huynh
Attorney, Agent, or Firm—William S. Frommer; Alvin Sinderbrand

[57] ABSTRACT

An image processing apparatus processes image information that includes pixels each of which have X-axis and Y-axis coordinates. The apparatus includes a circuit for processing the image information in an X-axis direction, a circuit for processing the image information in a Y-axis direction and a circuit for adding a predetermined value representing a coordinate in a Z-axis direction to each of the pixels of the image information so that the image information is expressed in three dimensions. In this way information representing a two-dimensional primitive image is transformed into pseudo three-dimensional image information that can be combined with three-dimensional images.

5 Claims, 8 Drawing Sheets

IMAGE PROCESSING APPARATUS FOR SYNTHESIZING Z-AXIS COORDINATE DATA USING X- AND Y-DIRECTION INCREMENTS

This application is a continuation of application Ser. No. 07/951,110, filed Sept. 25, 1992, now abandoned.

BACKGROUND OF THE INVENTION

1. Field of the Invention

This invention relates to an image processing apparatus, and more particularly is directed to such an apparatus that can create a pseudo three-dimensional image by adding a Z value to two-dimensional image data.

2. Description of the Prior Art

An arbitrary figure PT 10, as shown in FIGS. 1 and 2, is represented by image data that consists of two-dimensional coordinates defined with respect to X and Y axes and that has no Z axis coordinate data. Such image data cannot easily be combined with image data defined by three-dimensional coordinates.

For example, FIG. 3 schematically illustrates image data PT 12 defined by two-dimensional coordinates and image data PT 13 defined by three-dimensional coordinates. When it is intended to display together images represented both by the data PT 12 and the data PT 13, the data that can accurately be displayed in two dimensions is determined by the order in which the respective image data PT 12 and PT 13 is written in memory. Accordingly, in order to combine image data defined by two-dimensional coordinates with image data defined by three-dimensional coordinates, it is necessary to add Z coordinate data to the image data defined by two-dimensional coordinates.

It is known to calculate such Z coordinate data by means of a processor operating under software control and then to add the calculated Z coordinate data to the two-dimensional image data. However, such calculation of Z coordinate data requires an undesirably long period of time.

OBJECTS AND SUMMARY OF THE INVENTION

Accordingly, it is an object of the present invention to provide a processing system that can add a Z value to two-dimensional image data and so create a pseudo three-dimensional image with a relatively small amount of calculation and in a relatively short time.

In accordance with an aspect of the present invention, there is provided an apparatus for processing image information that includes pixels each having X-axis and Y-axis coordinates. The apparatus includes a circuit for processing the image information in an X-axis direction, a circuit for processing the image information in a Y-axis direction and a circuit for adding a predetermined value representing a coordinate in a Z-axis direction to each pixel of the image information so that the image information is expressed in three dimensions.

The foregoing apparatus provides for rapid calculation of the Z-axis coordinate data required to transform two-dimensional image data into pseudo three-dimensional image data.

The above, and other objects, features and advantages of the present invention will be apparent from the following detailed description thereof which is to be read in connection with the accompanying drawings.

DETAILED DESCRIPTION OF PREFERRED EMBODIMENTS

An embodiment of the invention will now be described with reference to FIGS. 4–9. The embodiment uses a line processor to create three-dimensional primitives. As used herein, the term "primitive" refers to a polygonal element that either directly images a polygon such as a triangle, rectangle, etc., or, alternatively, images a figure represented by such polygons.

The line processor is capable of rapidly generating a two-dimensional or three-dimensional primitive. More specifically, upon receipt of processing parameters, the line processor outputs corresponding data at a rate of up to 25,000,000 pixels per second.

The following are examples of primitives that may be generated by the line processor: two- or three-dimensional lines (i.e. straight lines), two- or three-dimensional triangles, two- or three-dimensional rectangles, other two- or three-dimensional polygons, a two-dimensional bit map, a two-dimensional pixel map, and a three-dimensional scan line pixel.

Color data to be output by the line processor may include 24 bits of real color data, 10 bits of index color data, 3 or 4 bits of dither color data and 1 bit of XP color data.

Also, the line processor may add attributes to the primitive such as a line pattern (represented by 32 bits), a hatch pattern (represented by 16×16 bits), a semi-transparent pattern (represented by 4×4 bits) and a line width (represented by 3 or 5 bits).

Figure 1:
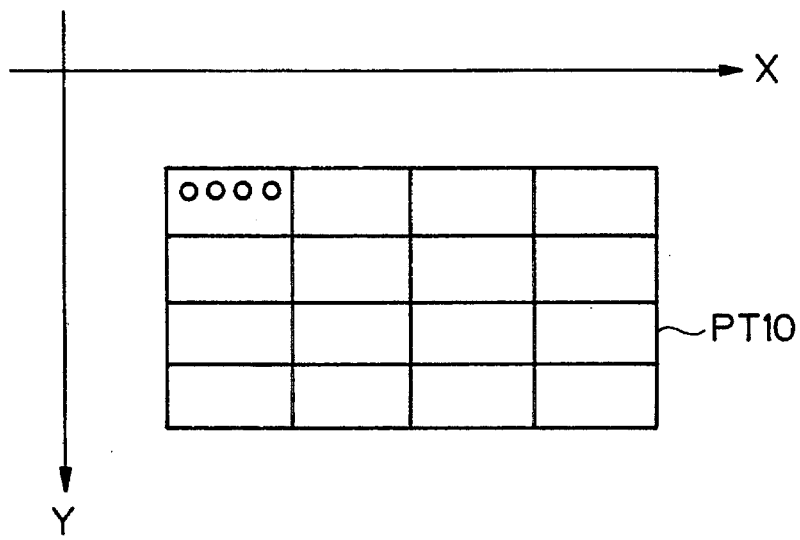
FIGS. 1 and 2 are schematic illustrations of image data defined by two-dimensional coordinates.
Figure 2:
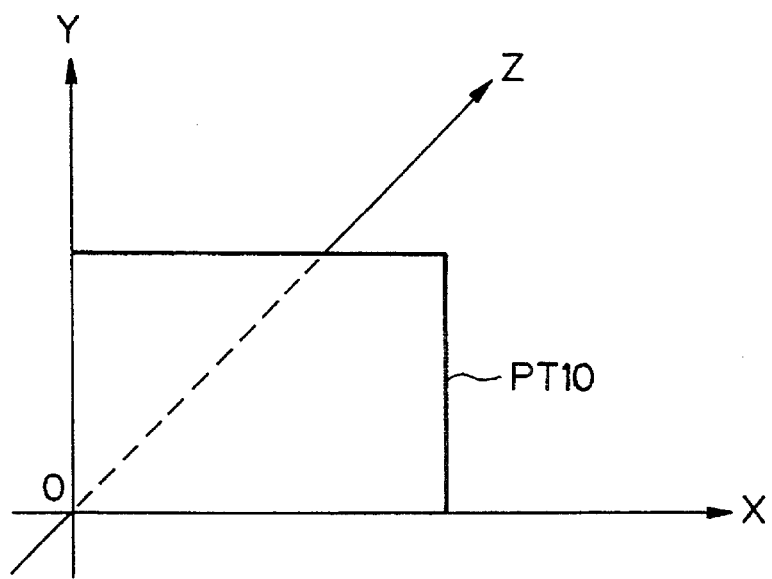
Figure 3:
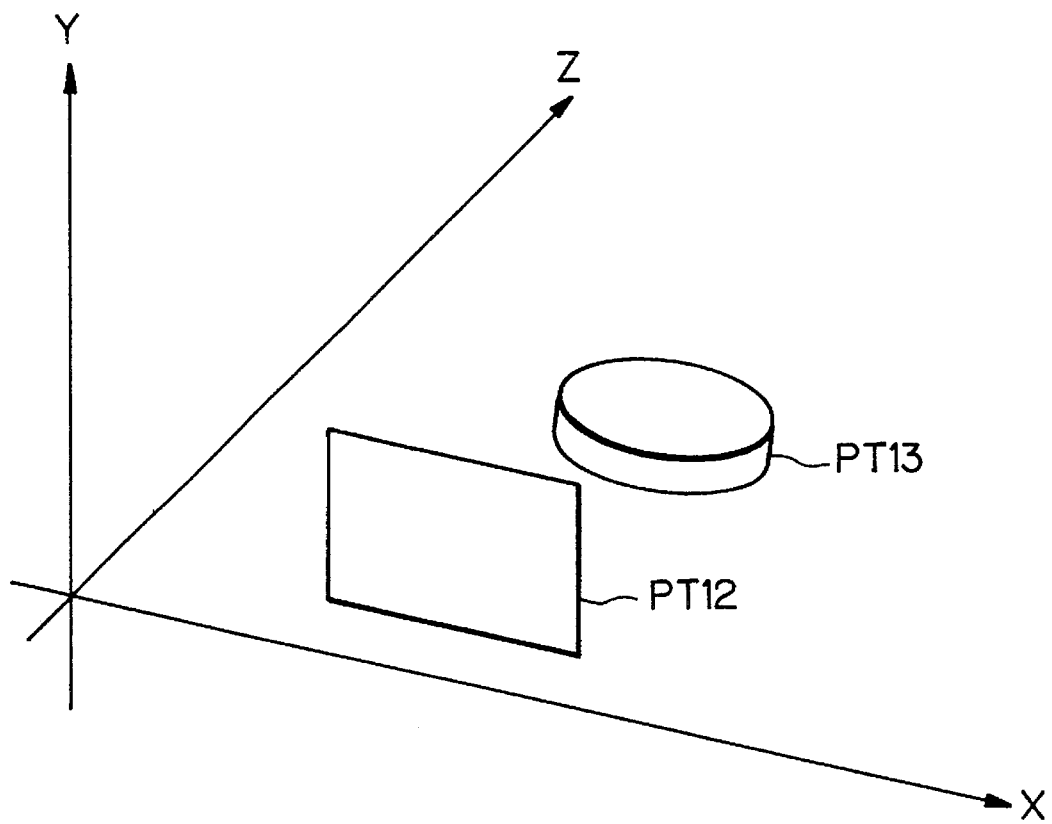
FIG. 3 is a schematic illustration of image data defined by three-dimensional coordinates.
Figure 4:
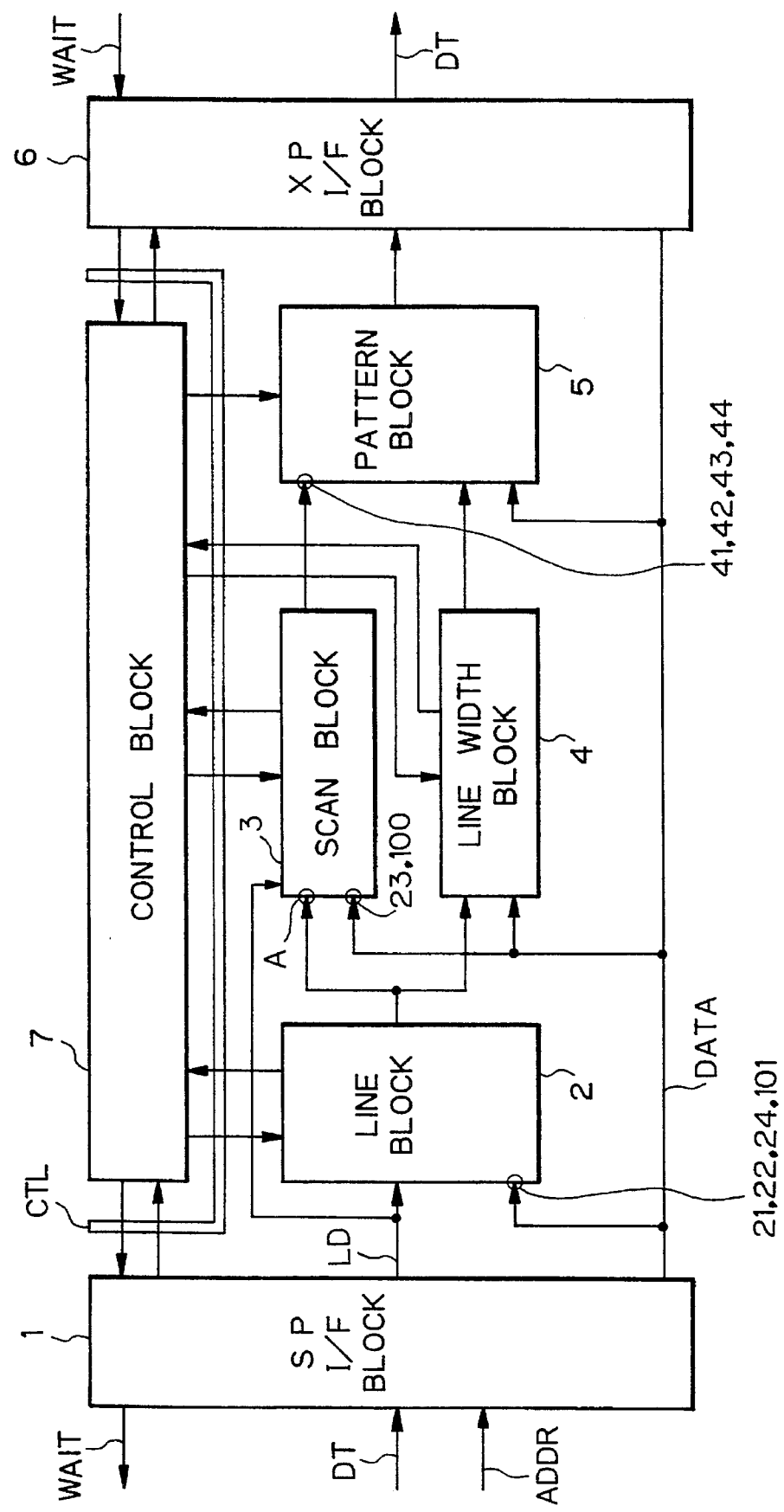
FIG. 4 is a block diagram of a processing system in accordance with an embodiment of the present invention.

The architecture of the line processor is illustrated in FIG. 4 and generally includes an SP interface block 1, a line block 2, a scan block 3, a line width block 4, a pattern block 5, an XP interface block 6 and a control block 7.

The SP interface block 1 receives parameters that define the primitive to be created and also receives incoming address data. The parameters and address information are indicated respectively as inputs DT and ADDR to SP interface block 1. SP interface block 1 also produces data at its outputs for loading into respective registers of other blocks of the line processor.

Figure 4A:
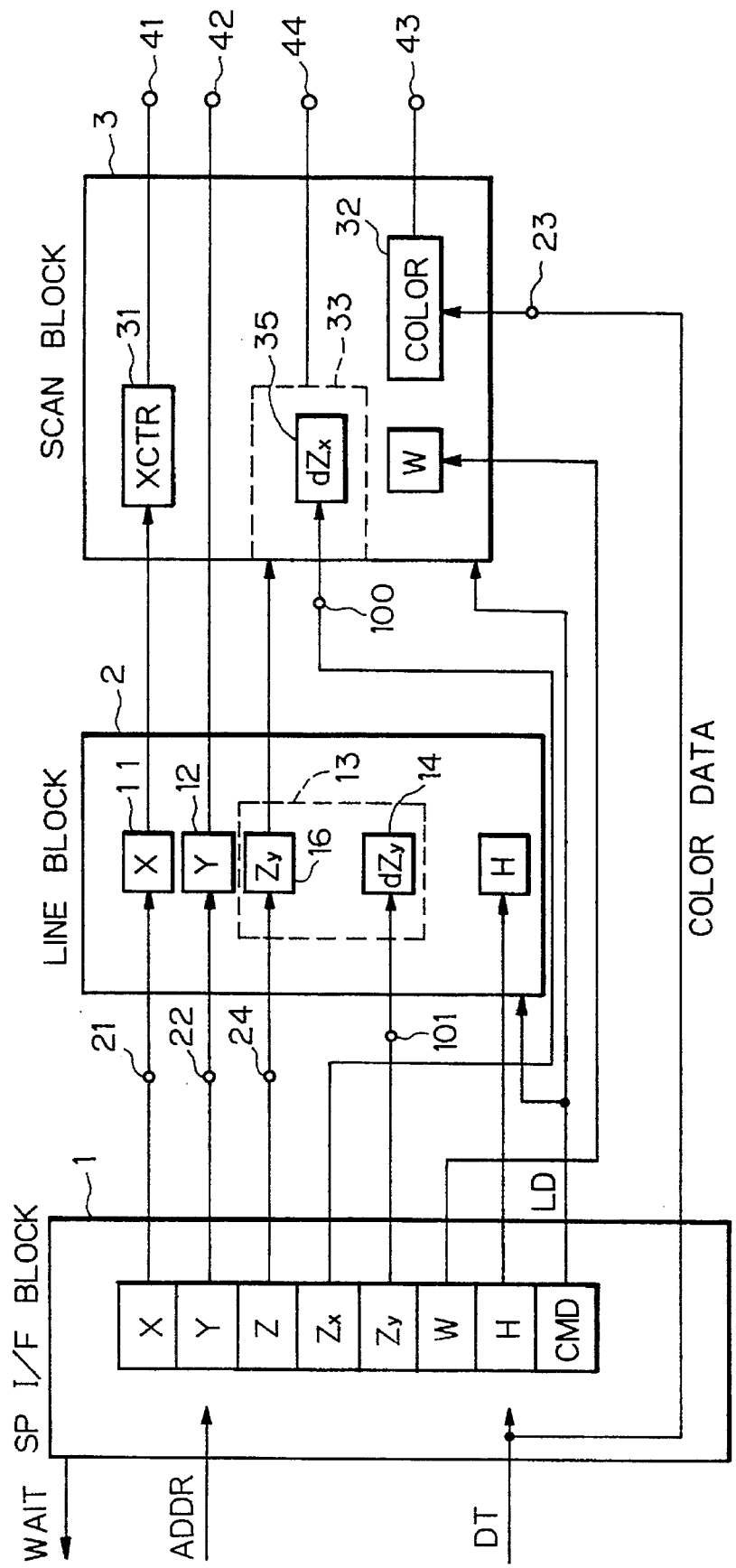
FIG. 4A schematically illustrates some details of, and connections among, an interface block, a line block and a scan block that form part of the processing system of FIG. 4.

Referring also now to FIG. 4A, SP interface block 1 includes addressable registers X, Y, Z, Zx, Zy, W, H and CMD. The X and Y registers store the X and Y coordinates of the basic location data for the primitive to be generated. The Z register holds a primary Z value. The Zx and Zy registers respectively hold X-axis and Y-axis direction increments for the Z value, as will be discussed below. The W and H registers are for storing respective data indicative of the width and height of the primitive to be generated. The CMD register holds command data as a load signal that causes data to be stored in the other blocks of the line processor.

Appropriate data DT received by SP interface block 1 are stored in accordance with address information ADDR in the respective registers. If the succeeding blocks are not occupied with generating a previous primitive when the command data is provided to SP interface block 1, then a load signal LD is provided to the succeeding blocks for loading of data, as will be described below. Data communication between SP interface block 1 and succeeding blocks is accompanied via a multiline connection labelled DATA in FIG. 4.

The SP interface block 1 is inhibited from producing output data when the succeeding blocks are occupied with processing. At such times, SP interface block 1 produces a WAIT signal to a preceding-stage circuit in order to interrupt transmission of data to SP interface block 1 until the production of output data by block 1 is no longer inhibited. At that time, block 1 then produces output data and ceases to generate the WAIT signal.

Referring again to FIG. 4, line block 2 creates a line or a polygonal contour on the basis of data received from SP interface block 1 by using algorithms such as Bresenham's algorithm. The interior of the polygon created by the line block 2 is scanned by scan block 3 in the X axis direction for the purpose of generating interpolated pixel data. Scan block 3 includes interpolation circuits for X-coordinate data, Y-coordinate data and R, G and B color data.

As will be described in more detail below, line block 2 and scan block 3 include circuitry for adding a Z value to two-dimensional coordinate data.

Line width block 4 adds a thickness to lines generated by line block 2 by adding appropriate data to pixels encircling X-Y coordinates provided by line block 2.

Pattern block 5 adds attributes such as line patterns, hatch patterns, semi-transparent patterns, dither patterns, and so forth, to a primitive generated by the preceding blocks. More specifically, pattern block 5 has stored therein data for generating line patterns, hatch patterns, semitransparent patterns, and dither patterns, and refers to that data in order to generate for each pixel appropriate pixel data so that the desired pattern is created.

XP interface block 6 supplies to a succeeding-stage circuit data DT for each pixel of the generated primitive.

Control block 7 controls the operation of all of the other blocks of the line processor, and is connected to those blocks by control lines CTL.

Figure 5:
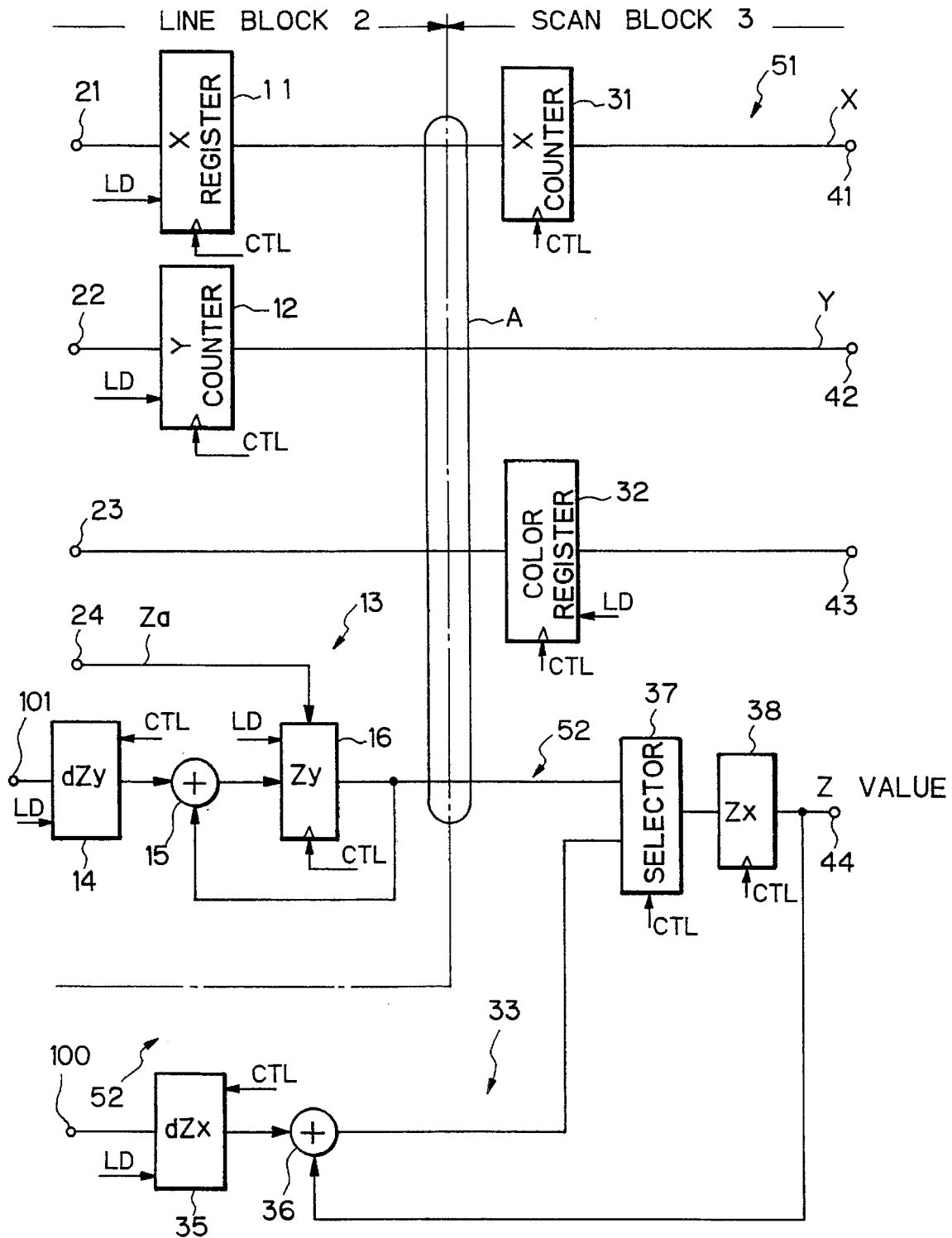
FIG. 5 is a schematic circuit diagram showing portions of a line block and a scan block that form part of the processing system of FIG. 4.

Circuitry for adding a Z value to two-dimensional coordinate data is shown in FIG. 5 and also in FIG. 4A.

In the circuit of FIG. 5, an address generator 51 is made up of an X register 11, and a Y counter 12, both of which are part of line block 2, as well as an X counter 31 that is part of scan block 3.

X register 11 stores an initial X coordinate value that is received from SP interface block 1 via a terminal 21. X register 11 loads the initial X coordinate value into X counter 31, which, as each clock cycle occurs, increments the loaded value and outputs an incremented value via a terminal 41 as the X coordinate data for each pixel.

Y counter 12 stores either an initial Y coordinate value received from SP interface block 1 via a terminal 22 or an incremented Y coordinate value. Y counter 12 outputs the stored Y coordinate value via a terminal 42.

Color register 32 receives, pixel by pixel, color-related R, G and B data (hereinafter called "color data"), which is received through a terminal 23 and is output via a terminal 43.

In the circuit of FIG. 5, a Z value computing section 52 is made up of a first Z value computing subsection 13 which is part of line block 2 and a second Z value computing subsection 33 which is part of scan block 3. First Z value computing subsection 13 includes a register 14, an adder 15 and a register 16. Second Z value computing subsection 33 includes a register 35, an adder 36, a selector 37 and a register 38.

Register 14 holds a value dZy corresponding to an amount by which the Z value is to be increased as processing proceeds in the Y axis direction. This amount will sometimes be referred to as the "Y-axis direction increment" for the Z value. Register 35 holds a value dZx corresponding to an amount by which the Z value is to be increased as processing proceeds in the X axis direction. This amount will sometimes be referred to as an "X-axis direction increment" for the Z value.

Adder 15 is connected to receive the value stored in register 14 and also the value stored in register 16, and adds the two values together, supplying the sum for storage in register 16. Adder 36 is connected to receive the value stored in register 35 and also the value stored in register 38. Selector 37 selectively couples either register 16 or adder 36 to register 38. For each scan in the X axis direction by scan block 3, selector 37 couples register 16 to register 38 upon receipt of data for the first pixel in the scan and thereafter couples adder 36 to register 38 upon receipt of data for each subsequent pixel in the scan.

X counter 31, terminal 42, color register 32 and selector 37 are respectively connected to X register 11, Y counter 12, terminal 23 and register 16 via a multi-line terminal A.

Control block 7 provides clock signals via a control line CTL to X register 11, X counter 31, Y counter 12, color register 32, and registers 14, 16, 35 and 38. By other control lines (not separately shown) control block 7 provides hold signals to registers 16 and 38 for latching data therein. Count up signals are provided to X counter 31 and Y counter 13 by control block 7 via other control lines (not separately shown). Also, by another control line that is not separately shown control block 7 provides a load data signal to X counter 31.

Operation of the system will now be explained with reference to FIG. 7–9. In particular, referring initially to FIG. 7, a Z value will be added to each pixel making up two-dimensional image data PT 1.

It will be assumed that the first scan begins with a pixel PX00 located at the bottom left corner of image data PT 1. Thus the value X0 of the X coordinate of pixel PX00 is provided as an initial value by SP interface block 1 to X register 11 via terminal 21.

The X coordinate value X0 is provided by register 11 to X counter 31, latched in X counter 31 in response to a signal received from control block 7, and output via terminal 41.

SP interface block 1 also supplies Y coordinate value Y0 as an initial value to Y counter 12 via terminal 22. Y coordinate value Y0 is stored in Y counter 12 and output via terminal 42.

SP interface block 1 provides color data for storage in color register 32 via terminal 23. Upon storage of the color data, it is output by color register 32 via terminal 43.

An initial Z value Za is provided by SP interface block 1 via terminal 24 and loaded in register 16. At the same time, the Y-axis direction increment dZy is loaded in register 14 via terminal 101 and the X-axis direction increment dZx is loaded in register 35 via terminal 100.

Also, data indicative of the height and width of the primitive to be generated is respectively loaded in register H of line block 2, and register W of scan block 3.

Since, as noted above, register 16 is connected to register 38 via selector 37 for the first pixel in a scan, the initial Z value Za is loaded from register 16 into register 38 and is output via terminal 44. The state of selector 37 is controlled by a signal provided by control block 7.

With the output of the color data via terminal 43 as mentioned above, it will be appreciated that an X coordinate value X0, a Y coordinate value Y0, and a Z value Zx (=Za) have respectively been provided to pattern block 5 as data for displaying pixel PX00.

Upon application of a clock signal supplied by control block 7, X counter 31 increments the X coordinate value stored therein, and outputs the incremented X coordinate value X1 via terminal 41. At the same time, the Y coordinate value Y0 is output via terminal 42.

Upon application of the same clock signal, the color data received from SP interface block 1 via terminal 23 is stored in color register 32 and then output by color register 32 via terminal 43.

Also upon application of the clock signal, the state of selector 37 is changed so that adder 36 is coupled to register 38 and adder 36 adds the initial value Za stored in register 38 and the X-axis direction increment dZx stored in register 35 and outputs the resulting sum Zx (=Za+dZx) via selector 37 for storage in register 38. That resulting Z value Zx is accordingly output via terminal 44 and is also available for feedback to adder 36.

It will be appreciated, then, that the incremented X coordinate value X1 provided by X counter 31 via terminal 41, the Y coordinate value Y0 provided as an initial value from Y counter 12 via terminal 42, color data via terminal 43, and the Z value Zx provided from register 38 are supplied, respectively, to pattern block 5 as data for displaying pixel 10.

In this fashion, with timing controlled by the aforesaid clock signal, an incremented X coordinate value Xi is provided via terminal 41 for each pixel of the first scan line, and the Y coordinate value Y0 is provided via terminal 42. (The value Y0 is held constant in register 16 during the entire scan by a hold signal provided by control block 7.) In addition, with the same timing, color data is provided via terminal 43 for each pixel, and a Z value Zx generated in the Z value computing section 52 is provided via terminal 44 for each pixel. All of these are provided to the succeeding-stage pattern block 5, as data for displaying the respective pixel.

Figure 7:
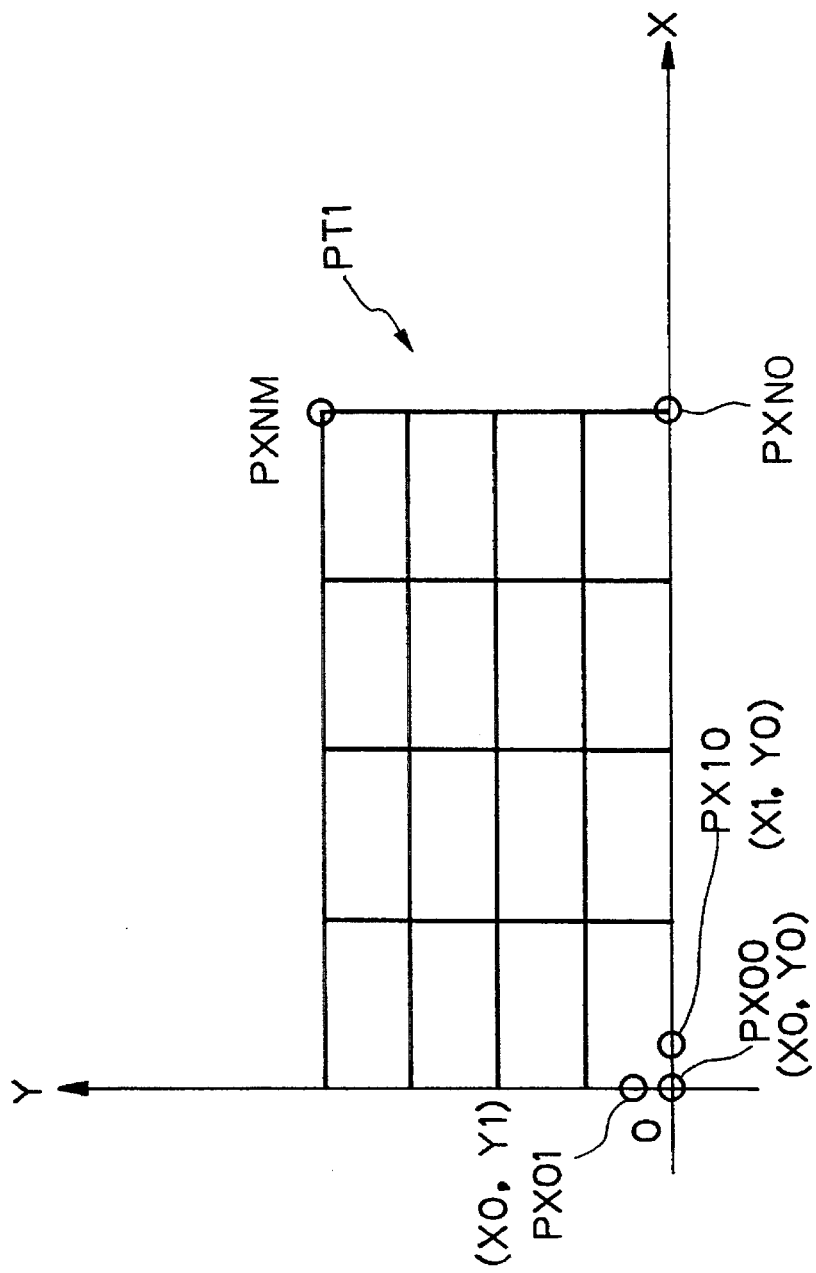
FIG. 7 schematically shows processing of two-dimensional image data in X-axis and Y-axis directions.

Referring again to the image data PT1 shown in FIG. 7, when the count value in X counter 31 reaches "N" (which corresponds to the width data stored in register W of scan block 3) and corresponding color data, X and Y coordinate values, and the Z value Zx are provided for pixel PXN0, the line scan in the X axis direction is completed. Pixel PX01 shown in FIG. 7 then becomes the start point for the next line scan.

As before, X coordinate value X0 representing the X coordinate of pixel PX01 is provided to X counter 31 by X register 11. That value is latched in X counter 31 and output via terminal 41.

At the same time, Y counter 12 increments the Y coordinate value Y0, so that a new Y coordinate value Y1 is output via terminal 42. Color data for the pixel PX01 is provided by SP interface block 1 via terminal 23 for storage in color register 32. Upon storage, the color data is output by color register 32 via terminal 43.

Also at this time, in first Z value computing subsection 13, the initial value Za stored in register 16 and the Y-axis direction increment dZy stored in register 14 are added by adder 15 and the resulting sum Zy (=Za+dZy) is then stored in register 16 where it is available for feedback to adder 15 on the next cycle.

In addition, the state of selector 37 is controlled so that register 16 is coupled to register 38 with the result that the value Zy, referred to above, is stored in register 38, from where it is output as Z value Zx via terminal 44 and also is available for feedback to adder 36.

As was discussed in connection with the previous line scan, for the processing of the next pixel, the state of selector 37 is controlled so that adder 36 will be coupled to provide its output to register 38.

Accordingly, the data for displaying pixel PX01 provided to pattern block 5 consists of X coordinate value X0, which is the initial value provided from X counter 31 via terminal 41, incremented Y coordinate value Y1 provided by Y counter 12 via terminal 42, color data provided via terminal 43, and Z value Zx provided by register 38 via terminal 44.

Thereafter, color data, X coordinate and Y coordinate values, and a Z value Zx for each pixel PXi1 are provided in the same manner to pattern block 5. In each case the Y coordinate value is Y1.

Figure 6:
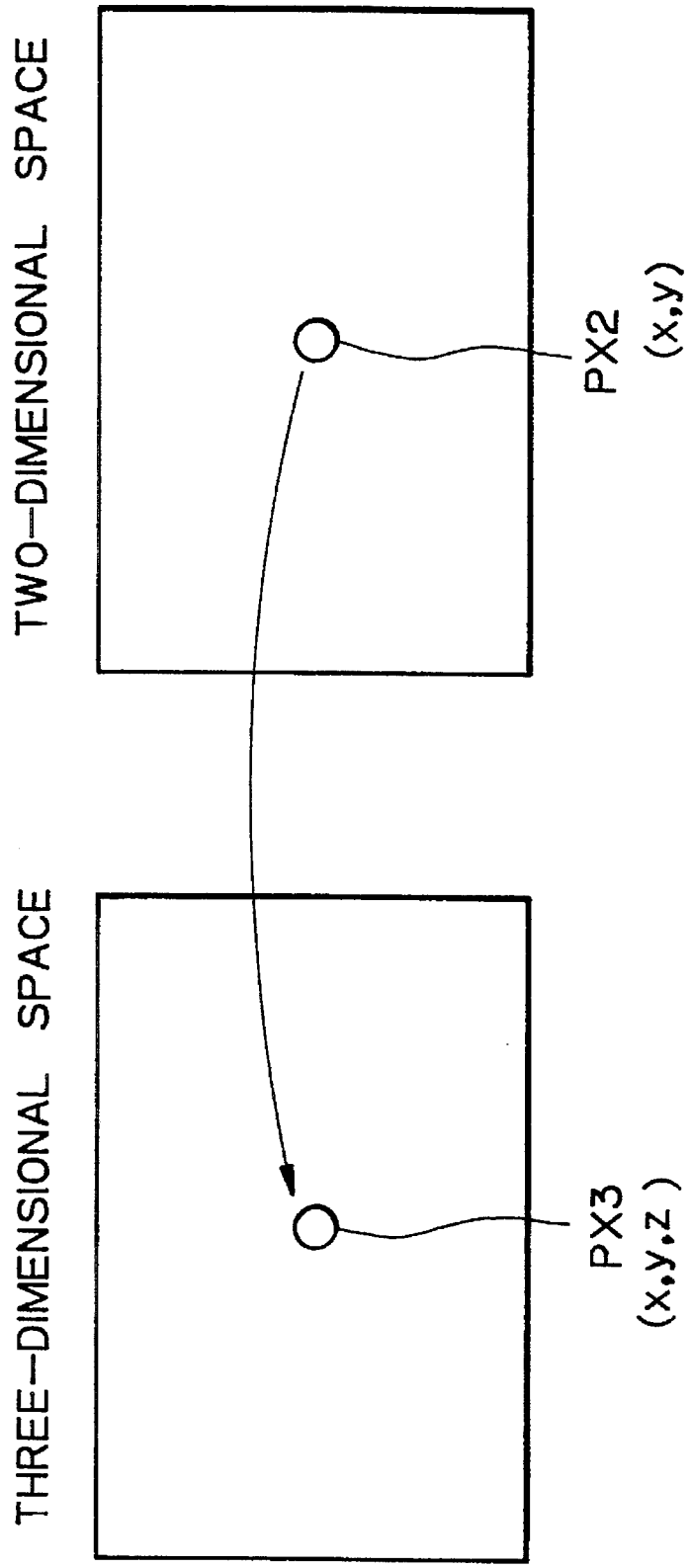
FIG. 6 schematically shows conversion of two-dimensional image data into three-dimensional image data.

FIG. 6 schematically illustrates conversion of two-dimensional image data into three-dimensional image data, according to the process described above. The coordinate values of pixel PX2 in two-dimensional space are expressed by (X, Y), and the Z value calculated for that pixel is represented by Z. As will be understood from the procedure described above, that Z value is calculated according to the following formula:

$$Z = (dZx)*(X-X0) + (dZy)*(Y-Y0) + Za$$

Accordingly, a resulting 3-dimensional pixel PX3 is generated and may be represented by (X,Y,Z) with Z being calculated as noted above.

It should be understood that the color data for pixel PX2 is used as the color data for pixel PX3.

Referring again to FIG. 7, the procedure described above for providing color data, X coordinate and Y coordinate values, and a Z value for each pixel PXij is carried out successively from pixel PX00 through pixel PXNM in the image data PT1, where M corresponds to the height data stored in register H of line block 2. Accordingly, a Z value Zx generated by Z value computing section 52 is added to each of the pixels PX00 through PXNM which form the image data PT1.

Figure 8:
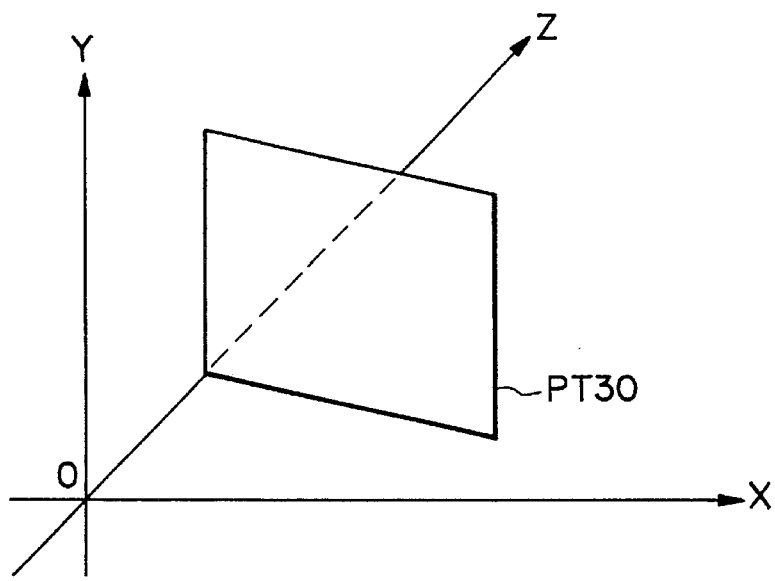
FIG. 8 schematically shows pseudo three-dimensional image data produced by adding Z values to two-dimensional image data.
Figure 9:
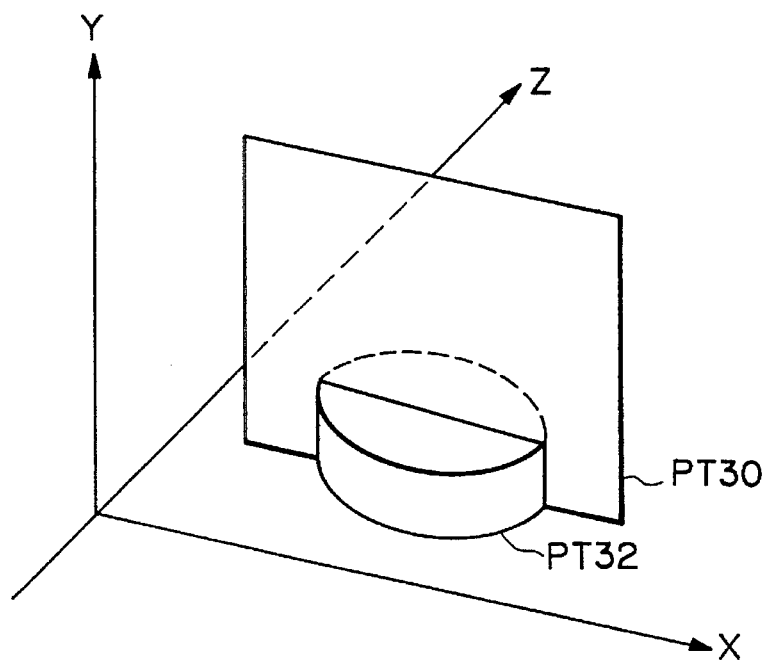
FIG. 9 schematically shows a combination of an image defined by three-dimensional image data with an image defined by pseudo three-dimensional image data.

Further, since a Z value Zx is added to each pixel PXij, the image data PT1 which is defined by 2-dimensional coordinates as shown in FIG. 7, can be considered as 3-dimensional image data PT30, for example, as shown in FIG. 8.

The image data PT30 shown in FIG. 8 has the same appearance as one to which no Z value has been added. However, when pseudo 3-dimensional image data PT30, and a 3-dimensional image data PT32 are combined, the combined image can be provided as shown in FIG. 9 on the basis of the respective Z values of image data PT30 and image data PT32. For example, the data making up image PT30 can be stored in an image memory (not shown). Then the Z coordinate of each pixel of image data PT32 is compared with the Z coordinate of the corresponding pixel of PT30, and only the pixels of PT32 positioned ahead of the corresponding pixels of PT30 are stored in the image memory in place of the corresponding pixels of PT30.

According to the embodiment as described above, Z values generated by Z value computing section 52 can be added to all pixels of an image data that is defined in terms of 2-dimensional coordinates. Thus, any such image data can also be defined with pseudo 3-dimensional coordinates, which makes it possible to combine such an image data with three dimensional image data.

It will appreciated that Z value computing section 52 is rather simple in design and can easily add a Z value Zx to image data defined in 2 dimensions, with less computation, and in less time, than is required for calculation of such data by a software-controlled processor.

Further, the processing system according to the present invention generates Z values that have predetermined inclinations in the X axis and Y axis directions in an area defined in two dimensions, and that data is added by a Z axis coordinate value adding circuit to provide pseudo 3-dimensional image data on the basis of 2-dimensional image data. This is accomplished rapidly, and with a relatively small amount of computation.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A method of generating Z-value coordinate data for a polygonal image element including two-dimensional image information that includes pixels each having X-axis and Y-axis coordinates, the method comprising the steps of:

storing an initial Z value, an X-axis direction Z increment, and a Y-axis direction Z increment;

generating respective Z values by means of a first circuit for each one of a first plurality of said pixels, all of said first plurality of pixels having a first common Y-axis coordinate, by sequentially and repeatedly incrementing said initial Z value by said X-axis direction Z increment; and generating respective Z values for each one of a second plurality of said pixels, all of said second plurality of pixels having a second common Y-axis coordinate, by incrementing said initial Z value by means of a second circuit using said Y-axis direction Z increment to form a Y-incremented Z value, supplying the Y-incremented Z value from the second circuit to the first circuit, and then sequentially and repeatedly incrementing said Y-incremented Z value by means of the first circuit using said X-axis direction Z increment.

2. The method of claim 1, further comprising the steps of generating respective Z values for each of a third plurality of pixels through an Mth plurality of pixels each having a respective common Y-axis coordinate $Y_j$ where j=2 to M, by producing by means of the second circuit a respective Y-incremented Z value equal to the sum of the initial Z value and the product of j and the Y-direction Z increment, and then by means of the first circuit sequentially and repeatedly incrementing the respective Y-incremented Z value by the X-axis direction Z increment.

3. An apparatus for generating Z value coordinate data for polygonal image element including two-dimensional image information that includes pixels each having X-axis and Y-axis coordinates, comprising:

first means for producing a respective line initial Z value for each of a plurality of pixel lines each having a common Y-axis coordinate by incrementing an image element initial Z value by a Y-axis direction increment; and second means for producing respective Z value coordinate data for each of the pixels in each pixel line, the second means including a circuit having an input coupled with the first means to receive the respective line initial Z value and operative to sequentially and repeatedly increment the respective line initial Z value by an X-axis direction Z increment;

wherein the first means comprises a first register for storing the Y-axis direction Z increment and a first accumulator means for producing the respective line initial Z value by storing the image element initial Z value as a first respective line initial Z value and adding the Y-axis direction Z increment thereto repeatedly to produce a sequence of respective line initial Z values; and the circuit of the second means comprises a second register for storing the X-axis direction Z increment and second accumulator means for producing the respective Z value coordinate data for each of the pixels in each line by storing the respective line initial Z value produced by the first means and adding the X-axis direction Z increment thereto repeatedly to produce a sequence of respective Z value coordinate data each corresponding to a respective pixel of said each line.

4. The apparatus of claim 3, wherein the first accumulator means comprises a third register having a first input for receiving the image element initial Z value and an output, and a first adding circuit having a first input coupled with the output of the third register and a second input coupled with the first register, the adding circuit having an output coupled with a second input of the third register.

5. The apparatus of claim 3, wherein the second accumulator means comprises a fourth register having an input and an output, a second adding circuit having a first input coupled with the output of the fourth register, a second input coupled with the second register to receive the X-axis direction Z increment therefrom and an output, and means for selectively providing one of (a) the respective line initial Z value from the first accumulator means and (b) the output of the second adding circuit to the input of the fourth register.

* * * * *